United States Patent [19]
Schmidt

[11] Patent Number: 5,749,238
[45] Date of Patent: May 12, 1998

[54] CONTROL ARRANGEMENT FOR A COOLING APPARATUS

[76] Inventor: Frede Schmidt, Ahlmannsvej 45, DK-6400 Sønderborg, Denmark

[21] Appl. No.: 793,817
[22] PCT Filed: Jul. 7, 1995
[86] PCT No.: PCT/DK95/00294
§ 371 Date: Feb. 14, 1997
§ 102(e) Date: Feb. 14, 1997
[87] PCT Pub. No.: WO96/07065
PCT Pub. Date: Mar. 7, 1996

[30] Foreign Application Priority Data

Aug. 27, 1994 [DE] Germany .................. 44 30 468.4

[51] Int. Cl.$^6$ ............................................... F25B 41/00
[52] U.S. Cl. ........................... 62/211; 62/225; 62/213
[58] Field of Search ...................... 62/211, 223, 222, 62/225, 213

[56] References Cited

U.S. PATENT DOCUMENTS

| | | | |
|---|---|---|---|
| 4,112,703 | 9/1978 | Kountz | 62/211 |
| 4,478,051 | 10/1984 | Ibrahim | 62/211 X |
| 4,674,292 | 6/1987 | Ohya et al. | 62/223 |
| 4,735,060 | 4/1988 | Alsenz | 62/225 X |
| 5,109,676 | 5/1992 | Waters et al. | 62/223 X |

FOREIGN PATENT DOCUMENTS

84/03933  10/1984  Japan .................. 62/223

*Primary Examiner*—Henry A. Bennett
*Assistant Examiner*—Susanne C. Tinker
*Attorney, Agent, or Firm*—Lee, Mann, Smith, McWilliams, Sweeney & Ohlson

[57] ABSTRACT

A control arrangement for cooling of an apparatus comprising a compressor, a condenser, and at least one branch with an expansion valve and an evaporator in series, contains a controller, a superheat temperature measuring device, and an ambient temperature sensor. The controller controls the expansion valve for maintaining the superheat temperature substantially at the desired value. The flow of coolant to the evaporator is controlled by the signal from the temperature sensor for maintaining the ambient temperature constant. The controller operates continuously and in two operating modes in which the first mode the superheat temperature is controlled to the maximum admissible state of fill of liquid coolant in the evaporator and is switchable to a second mode in which the state of fill of liquid coolant is controlled by the expansion valve.

7 Claims, 1 Drawing Sheet

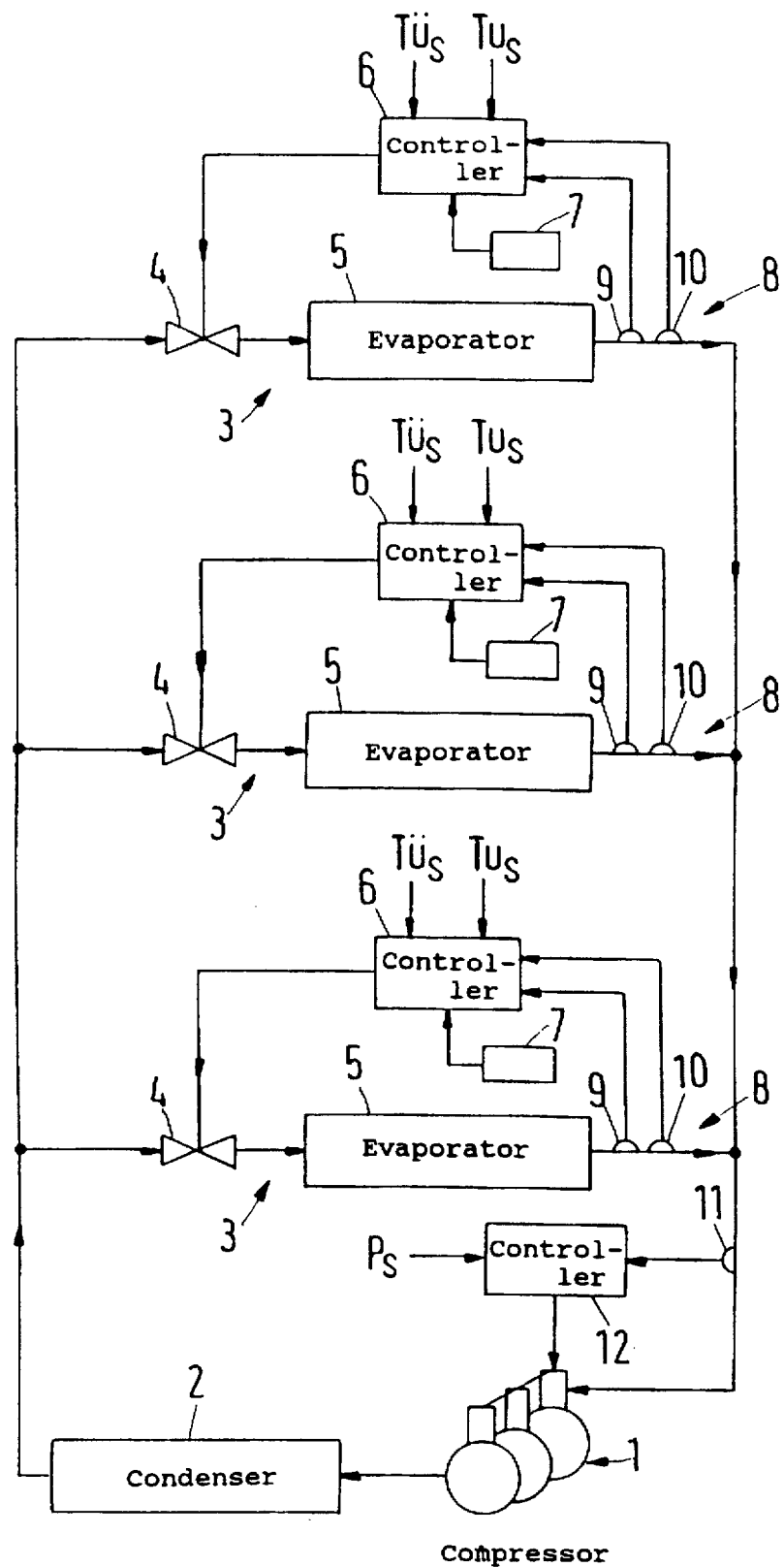

CONTROL ARRANGEMENT FOR A COOLING APPARATUS

BACKGROUND OF THE INVENTION

The invention relates to a control arrangement for a cooling apparatus, having a cooling circuit in which a compressor, a condenser and at least one branch with an expansion valve and a downstream evaporator are connected in series, having a controller, a measuring device for the superheat temperature of the vapour of a liquid coolant evaporated in the evaporator and a sensor for the ambient temperature of the evaporator, the controller controlling the expansion valve in dependence on the difference in the desired value and actual value of the superheat temperature for the purpose of reducing the difference, and the flow of liquid coolant to the evaporator being controllable in dependence on the measured value of the ambient temperature sensor for the purpose of maintaining the ambient temperature at a constant value.

In a known cooling apparatus of that kind, it is usual for the ambient temperature, for example, the air temperature in the cooling area, to be controlled in dependence on the ambient temperature of the evaporator by means of an on-off action thermostat valve lying in the liquid coolant line upstream of the expansion valve, which expansion valve controls the superheat temperature of the liquid coolant evaporated in the evaporator. The repeated opening and closing of the thermostat valve causes the ambient temperature of the evaporator to be subject to considerable fluctuation. Since the switching-on and switching-off temperature values of the thermostat valve have to be different in order to avoid too frequent a switching, but on the other hand the temperature of the goods to be cooled may not exceed an upper limit value for too long, the mean value of the ambient temperature, or the temperature of the goods to be cooled, resulting from switching on and off the thermostat valve lies comparatively far below the admissible upper limit value of the temperature of the goods to be cooled. The mean value of the refrigeration output, which is higher, the lower is the temperature to be maintained, is consequently always higher than necessary. Moreover, the output of the compressor is also subject to considerable fluctuation, either its speed or its pressure being continuously or discontinuously changed, the latter as a consequence of its output being switched on and off or being changed in steps, as in the case of a multi-stage compressor, which leads to additional energy loss on account of the inertial mass of its moving parts.

Then, however, the use of two valves before the evaporator is expensive.

SUMMARY OF THE INVENTION

The invention is based on the problem of providing a control arrangement of the kind mentioned in the introduction, which provides greater efficiency of the cooling apparatus combined with a simpler construction.

According to the invention that problem is solved in that the controller has a continuous action and is connected to the ambient temperature sensor, and that on reaching a refrigeration temperature in a first operating mode in which the superheat temperature is controlled whilst complying with the maximum admissible state of fill of liquid coolant in the evaporator, the controller is switchable to a second operating mode in which the state of fill of liquid coolant in the evaporator is controlled by the expansion valve for the purpose of maintaining the refrigeration temperature.

With this solution, at the beginning, if desired, after a starting-up and de-frosting operation, in a first operating phase in which the first operating mode is applied, the goods to be cooled are cooled very rapidly to the desired low temperature by the superheat temperature control with the liquid coolant at maximum state of fill in the evaporator; then, in a second operating phase, in which the second operating mode is applied, that is to say, by continuous control of the ambient temperature, the temperature of the goods to be cooled is maintained at the desired low value by controlling the effective cooling surface of the evaporator solely in accordance with requirements, that is, the heat extraction of the goods to be cooled, by continuously changing the degree of opening of the expansion valve and accordingly the state of fill of liquid coolant in the evaporator. The desired value of the ambient temperature can here be selected so that it is almost or exactly the same as the maximum admissible refrigeration temperature of the goods to be cooled, that is, does not lie substantially below that temperature, as in the case of an on-off temperature control in which the desired value is selected to be the same as the mean value of the fluctuating temperature. In this way there is a considerable saving of energy. By virtue of the continuous control, the compressor is not required to undergo sudden changes of output. Just one valve, the expansion valve, is sufficient.

Preferably, when a minimum value of the superheat temperature is exceeded during the second operating mode, provision is made for the controller to be switchable to control of the superheat temperature to above the minimum value. In this way it is possible to ensure that even during control of the ambient temperature in the second operating phase or operating mode, in which the ambient temperature or temperature of the goods to be cooled is determined by appropriate control of the state of fill of liquid coolant in the evaporator, a so-called "surface control", the maximum admissible state of fill in the evaporator is not exceeded because of too low a superheat temperature (falling below the minimum value), and thus so-called "liquid shocks" are avoided.

The expansion valve can then be electronically controllable and the controller can be an electronic controller. This configuration permits a space-saving construction.

For several branches lying parallel in the cooling circuit, each having an expansion valve and evaporator, it is advantageous for a compressor of adjustable output to be allocated to all branches jointly and for each expansion valve to have its own controller of the said kind. Such a configuration is advantageous in the case of relatively large cooling systems, such as those used in supermarkets, for example, for a plurality of chest freezers having a multi-stage compressor, because the use of the invention in this particular case avoids frequent switching of the compressor stages.

BRIEF DESCRIPTION OF THE DRAWING

The invention is described in more detail hereinafter with reference to the drawing showing a preferred embodiment.

DESCRIPTION OF AN EXAMPLE EMBODYING THE BEST MODE OF THE INVENTION

A compressor 1, a condenser 2 and several parallel branches 3, each having an expansion valve 4 and a downstream evaporator 5, are connected in series in a cooling circuit. The control input of each expansion valve 4 is connected to the output of a separate controller 6; in turn, the controller is supplied on the one hand with a desired superheat temperature value $Tü_s$ and a desired ambient temperature value $Tu_s$, and on the other hand, from a sensor 7 measuring the ambient temperature of the evaporator, for example, the air temperature in the cooling area or the temperature of the goods to be cooled, is supplied with the actual value of the ambient temperature, and with the measured values from a measuring device 8 for the superheat temperature of the vapour of a liquid coolant evaporated in the evaporator 5. The measuring device 8 in the illustrated example consists of a sensor 9 for the vapour pressure at the output of the evaporator 5 and of a sensor 10 for the temperature at the output of the evaporator. The vapour pressure is here a measure of the temperature of the liquid coolant in the evaporator, since this temperature during the evaporation corresponds to the boiling temperature. Instead of the illustrated construction of the measuring device 8, (whilst retaining the sensor 10) the temperature could also be measured at the input of the evaporator 5. From the measured values of the measuring device 8 the controller 6 then determines the actual value of the superheat temperature by converting the pressure measured value into a temperature measured value and forming the difference of the two temperature measured values.

Each controller 6 has a continuous action. Both the expansion valves 4 and the controllers 6 are of electronic construction.

Connected to the intake line of the compressor 1 is a pressure sensor 11 which supplies the measured value of pressure to a controller 12. The controller 12 also receives a desired pressure value Ps; it controls the pressure, and thus the output, of the compressor 1 in steps.

During operation, the liquid coolant vapour compressed by the compressor 1 is cooled in the condenser 2, and thus re-liquefied, and is subsequently supplied by way of the expansion valves 4 to the respective evaporator 5.

In a first operating mode or operating phase, if desired after a starting-up and defrosting phase, each controller 6 operates with superheat temperature control whilst complying with the maximum admissible state of fill of liquid coolant in the associated evaporator 5. Once the desired refrigeration temperature has been reached, the operation of each controller 6 is switched over to a second operating mode in which the state of fill of liquid coolant in the associated evaporator 5 is controlled by the associated expansion valve 4 for the purpose of maintaining the ambient temperature measured by the sensor 7 at a desired ambient temperature valve $Tu_s$ corresponding to the refrigeration temperature. That is, the desired ambient temperature value $Tu_s$ is selected to be the same as the maximum admissible refrigeration temperature so that the cooling apparatus manages to maintain the desired refrigeration temperature with minimum energy, in contrast to an on-off control of the ambient temperature or the temperature of the goods to be cooled which has previously been implemented. With an on-off temperature control, the desired value must be set below the maximum admissible temperature of the goods to be cooled, because as a result of the extreme fluctuations in the temperature in an on-off temperature control around a mean value which is the same as the desired value, the maximum admissible temperature of the goods to be cooled can be considerably exceeded if the desired value approaches too close to the maximum admissible temperature of the goods to be cooled.

In addition, the frequency of the switching operations of the compressor is considerably reduced by virtue of the continuous control.

Corresponding advantages are also obtained in the case of a cooling apparatus having just one branch 3 in place of several parallel branches 3.

I claim:

1. A control arrangement for a cooling apparatus having a cooling circuit in which a compressor, a condenser and at least one branch with an expansion valve and a downstream evaporator are connected in series, the cooling apparatus further having a controller, a measuring device connected to the controller for measuring superheat temperature of the vapor of a liquid coolant evaporated in the evaporator and a sensor connected to the controller for sensing ambient temperature of the evaporator, the controller being connected to the expansion valve for controlling the expansion valve in dependence on a difference in a desired value and actual value of the superheat temperature for the purpose of reducing the difference, and flow of liquid coolant to the evaporator being controllable in dependence on the measured value of the ambient temperature for the purpose of maintaining the ambient temperature at a constant value, the controller having a continuous action, and the controller being switchable between a first operating mode in which the superheat refrigeration temperature is reduced while complying with the maximum admissible state of fill of liquid coolant in the evaporator and, after a desired refrigeration temperature is reached, a second operating mode in which the state of fill of liquid coolant in the evaporator is controlled by the expansion valve for the purpose of maintaining the refrigeration temperature.

2. A control arrangement according to claim 1, in which, when a minimum value of the superheat temperature is exceeded during the second operating mode, the controller is switchable to control of the superheat temperature to above the minimum value.

3. A control arrangement according to claim 1, in which the expansion valve is electronically controllable and the controller is an electronic controller.

4. A control arrangement according to claim 3, in which, for several branches lying parallel in the cooling circuit, each having an expansion valve and evaporator, a compressor of adjustable output is allocated to all branches jointly and each expansion valve has its own of said controllers.

5. A control arrangement according to claim 2, in which the expansion valve is electronically controllable and the controller is an electronic controller.

6. A control arrangement according to claim 5, in which, for several branches lying parallel in the cooling circuit, each having an expansion valve and evaporator, a compressor of adjustable output is allocated to all branches jointly and each expansion valve has its own of said controllers.

7. A control arrangement according to claim 1, in which, for several branches lying parallel in the cooling circuit, each having an expansion valve and evaporator, a compressor of adjustable output is allocated to all branches jointly and each expansion valve has its own of said controllers.

* * * * *